US012602704B2

(12) United States Patent
Nadolny et al.

(10) Patent No.: US 12,602,704 B2
(45) Date of Patent: Apr. 14, 2026

(54) SYSTEM AND METHOD FOR DETERMINING ENGAGEMENT IN COLLABORATIVE SOFTWARE APPLICATIONS

(71) Applicant: Townhall Pro, Inc., Kitty Hawk, NC (US)

(72) Inventors: Peter J. Nadolny, Kitty Hawk, NC (US); Larysa Nadolny, Kitty Hawk, NC (US)

(73) Assignee: Townhall Pro, Inc., Kitty Hawk, NC (US)

( * ) Notice: Subject to any disclaimer, the term of this patent is extended or adjusted under 35 U.S.C. 154(b) by 0 days.

(21) Appl. No.: 18/511,356

(22) Filed: Nov. 16, 2023

(65) Prior Publication Data

US 2024/0169383 A1      May 23, 2024

Related U.S. Application Data

(60) Provisional application No. 63/384,184, filed on Nov. 17, 2022.

(51) Int. Cl.
G06Q 30/02          (2023.01)
G06Q 30/0217       (2023.01)

(52) U.S. Cl.
CPC ................................. G06Q 30/0217 (2013.01)

(58) Field of Classification Search
CPC ........ G06Q 30/0207–30/0277; G06Q 30/0217
See application file for complete search history.

(56) References Cited

U.S. PATENT DOCUMENTS

| | | | |
|---|---|---|---|
| 1,136,706 | A | 4/1915 | Oedekerk |
| 10,116,801 | B1 * | 10/2018 | Christiano ............ H04M 3/563 |

| | | | |
|---|---|---|---|
| 10,397,519 | B1 * | 8/2019 | Kurisaki-Sagberg ........................ H04N 7/147 |
| 11,095,853 | B1 | 8/2021 | Aher et al. |
| 11,128,636 | B1 * | 9/2021 | Jorasch ................ G06F 3/0346 |
| 11,432,047 | B1 | 8/2022 | Panchaksharaiah et al. |
| 2013/0005438 | A1 * | 1/2013 | Ocko ...................... H04W 4/21 463/25 |

(Continued)

OTHER PUBLICATIONS

Gallup, 'Hybrid Work', Gallup [online], [retrieved on Jan. 9, 2024], Retrieved from: https://www.gallup.com/401384/indicator-hybrid-work.aspx#:~:text=According%20to%20Gallup's%20May%202023,28%25%20of%20exclusively%20remote%20employees.&text=Data%20are%20among%20U.S.%20full%2Dtime%20employees.,-Get%20the%20data.

(Continued)

*Primary Examiner* — Thuy N Nguyen

(74) *Attorney, Agent, or Firm* — Jordan E. Meggison-Decker; BrownWinick Law Firm

(57)          ABSTRACT

A system and method for calculating engagement of users of collaborative software applications. During a virtual collaborative event, behavioral data for participants is collected. Individual engagement scores for each participant are calculated using the collected behavioral data. Aggregated engagement scores of participants are presented to the host of the virtual collaborative event, and an individual participant's engagement score is presented to that participant. Based on the calculated engagement scores, the host or the system may provide gamification rewards to individual participants to reward favorable participation in the virtual collaborative event. The host may also provide activities to participants to increase engagement based on the calculated engagement scores.

3 Claims, 4 Drawing Sheets

(56) References Cited

U.S. PATENT DOCUMENTS

| | | | | |
|---|---|---|---|---|
| 2017/0228135 | A1 | 8/2017 | Vendrow et al. | |
| 2018/0007100 | A1* | 1/2018 | Krasadakis | G06Q 10/1095 |
| 2018/0286272 | A1* | 10/2018 | Mcdermott | A63F 13/46 |
| 2018/0349485 | A1* | 12/2018 | Carlisle | G06F 16/9535 |
| 2019/0026836 | A1* | 1/2019 | Milkovich | G06Q 40/08 |
| 2019/0238682 | A1 | 8/2019 | Christiano et al. | |
| 2020/0143636 | A1* | 5/2020 | Cire | G07F 17/34 |
| 2021/0076002 | A1* | 3/2021 | Peters | H04N 7/152 |
| 2021/0350330 | A1 | 11/2021 | Howard, Jr. et al. | |
| 2021/0394073 | A1* | 12/2021 | Osman | A63F 13/87 |
| 2021/0399911 | A1* | 12/2021 | Jorasch | H04L 12/1818 |
| 2021/0399912 | A1 | 12/2021 | Stewart | |
| 2022/0014571 | A1 | 1/2022 | Polish et al. | |
| 2022/0014580 | A1 | 1/2022 | Shadfar et al. | |
| 2022/0027605 | A1 | 1/2022 | De Keyser et al. | |
| 2022/0086393 | A1 | 3/2022 | Peters | |
| 2022/0138775 | A1 | 5/2022 | Mamdur et al. | |
| 2022/0168653 | A1 | 6/2022 | Weising et al. | |
| 2022/0198949 | A1* | 6/2022 | Jain | G09B 5/12 |
| 2024/0037478 | A1* | 2/2024 | Jhuremalani | G06Q 10/06393 |

OTHER PUBLICATIONS

Kurtzman, Wayne, 'Worldwide Collaborative Applications Forecast, 2023-2027: The AI-Enhanced Multiplayer Workplace', Jul. 2023 (abstract), International Data Corporation [online], [retrieved on Jan. 9, 2024], Retrieved from: https://www.idc.com/getdoc.jsp?containerId=U.S. Appl. No. 51/040,423.

Zoom, 'Zoom Services Description', Zoom [online], Dec. 18, 2023 [retrieved on Jan. 10, 2024]. Retrieved from: https://explore.zoom.us/en/services-description/.

Microsoft, 'Microsoft Teams service description', Microsoft [online], Oct. 23, 2023 [retrieved on Jan. 10, 2024]. Retrieved from: https://learn.microsoft.com/en-us/office365/servicedescriptions/teams-service-description.

Linden Lab, 'Original Metaverse Second Life Celebrates 20th Birthday', Linden Lab [online], Jun. 22, 2023 [retrieved on Jan. 10, 2024]. Retrieved from: https://lindenlab.com/press-release/original-metaverse-second-life-celebrates-20th-birthday.

Meta, 'Meta for Work', Meta [online], [retrieved on Jan. 10, 2024]. Retrieved from: https://forwork.meta.com/?utm_content=39727.

Google, 'About Glass Enterprise Edition 2', Google [online], [retrieved on Jan. 10, 2024]. Retrieved from: https://support.google.com/glass-enterprise/customer/answer/9220200?hl=en&ref_topic=9235678&sjid=4527779448710020690-NC.

Vuzix, Vuzix Z100 Developers Edition, Vuzix [online], Jan. 3, 2024 [retrieved on Jan. 10, 2024]. Retrieved from: https://vuzix-website.s3.amazonaws.com/files/Content/product-sheets/Vuzix-Z100-Smart-Glasses-v1.1.pdf.

Mediapost, 'Text vs. Talk Gets Millennials' Attention', MediaPost (online), May 13, 2016 [retrieved Feb. 21, 2025]. Retrieved from https://www.mediapost.com/publications/article/275332/text-vs-talk-gets-millennials-attention.html.

* cited by examiner

100

140

Initiate Platform
Integration

Video Conferencing, AR
or VR Platform

Send
Webhook
Events

Call
Platform
APIs

Send Platform
Integration
Response

130

110

Call API

Client

Web
Browser

Send API Response

Backend
Server

Write Data

Frontend
Application

Initiate Real-Time
Communication

Read Data

Database

Send Real-Time
Events

120

200

300

Engagement Score =
$(V1*W1)+(V2*W2)+(V3*W3)+(V4*W4)+(V5*W5)+(V6*W6)+(V7*W7)+(V8*W8)+(V9*W9)+(V10*W10)+(V11*W11)+(V12*W12)+(V13*W13)+(V14*W14)+(V15*W15)+(V16*W16)+(V17*W17)+(V18*W18)+(V19*W19)+(V20*W20)+(V21*W21)+(V22*W22)+(V23*W23)+(V24*W24)+(V25*W25)$

| V1 = | Camera On | W1 = | 6.00% | V14 = | 3rd Share Screen | W14 = | 4.00% |
| V2 = | Camera Off | W2 = | 2.00% | V15 = | 4th Share Screen | W15 = | 4.00% |
| V3 = | Mic On | W3 = | 6.00% | V16 = | 1st Emoji Post | W16 = | 4.00% |
| V4 = | Mic Off | W4 = | 2.00% | V17 = | 2nd Emoji Post | W17 = | 4.00% |
| V5 = | Join Meeting | W5 = | 6.00% | V18 = | 3rd Emoji Post | W18 = | 4.00% |
| V6 = | Leave Meeting | W6 = | 2.00% | V19 = | 4th Emoji Post | W19 = | 4.00% |
| V7 = | 1st Post to Chat | W7 = | 4.00% | V20 = | 5th Emoji Post | W20 = | 4.00% |
| V8 = | 2nd Post to Chat | W8 = | 4.00% | V21 = | 1st Post to Reaction | W21 = | 4.00% |
| V9 = | 3rd Post to Chat | W9 = | 4.00% | V22 = | 2nd Post to Reaction | W22 = | 4.00% |
| V10 = | 4th Post to Chat | W10 = | 4.00% | V23 = | 3rd Post to Reaction | W23 = | 4.00% |
| V11 = | 5th Post to Chat | W11 = | 4.00% | V24 = | 4th Post to Reaction | W24 = | 4.00% |
| V12 = | 1st Share Screen | W12 = | 4.00% | V25 = | 5th Post to Reaction | W25 = | 4.00% |
| V13 = | 2nd Share Screen | W13 = | 4.00% | | | | |

Points are awarded for each variable then weighted to derive an engagement score

Fig. 4

SYSTEM AND METHOD FOR DETERMINING ENGAGEMENT IN COLLABORATIVE SOFTWARE APPLICATIONS

CROSS REFERENCE TO RELATED APPLICATIONS

The present application claims priority to U.S. Provisional Application 63/384,184 entitled SYSTEM AND METHOD FOR DETERMINING ENGAGEMENT IN COLLABORATIVE SOFTWARE APPLICATIONS, and filed on Nov. 17, 2022, the entirety of which is hereby incorporated by reference herein, including any figures, tables, drawings, or other information.

FIELD OF THE DISCLOSURE

This disclosure relates generally to a system and method for determining engagement in collaborative software applications, and in particular to providing game mechanics such as points, coins, boosts, leaderboards, and badges through collaborative software applications to promote participant engagement and quantifying an engagement score for each participant based on participants' use of the provided game mechanics or the collaborative software applications.

BACKGROUND OF THE DISCLOSURE

The growth in remote and hybrid work has accelerated the use of digital technologies for collaboration. Tools like video conferencing software and virtual worlds allow teams of workers from different regions of the USA and world to collaborate in real time.

The COVID-19 pandemic has permanently changed the way we live and work. Seventy-eight percent of employees who can work remotely, prefer to work either exclusively remotely or in a hybrid fashion, and this percentage is expected to rise to 93% by September 2024. Hybrid Work, GALLUP, https://www.gallup.com/401384/indicator-hybrid-work.aspx#:~:text=According%20to%20Gallup's%20May%202023, 28%25%20of%20exclusively%20remote%20employees.& text=Data%20are%20among%20U.S.%20full%2Dtime% 20employees.,-Get%20the%20data (last visited Nov. 15, 2023). This new shift in workforce dynamics has accelerated the use of digital collaboration tools as a means to connect with teammates and colleagues.

From human resources training sessions to educational classes to conference events, collaborative software can allow many people to attend the same event in real time. Instructors are able to teach students from remote distances and music fans are able to virtually attend live concerts from the comfort of their homes. The convenience of virtual work and learning can save time, effort, and costs across the global economy.

Digital collaboration technologies can take multiple forms. Desktop application software such as Zoom and Microsoft Teams allow users to use microphones and cameras to connect to each other in a tiled format on the screen. Virtual worlds such as Second Life and Meta use headsets to immerse users in a 3D representation of the world. Augmented reality glasses such as Google Glass and Vuzix superimpose the digital experience over the real world. Using a network connection, software, and hardware, users are transported to a new, collaborative space for working and learning.

In these collaborative environments, one or multiple users start or host the meeting. As with in-person events, hosts are responsible for engaging with the audience, gauging interest, providing an organized event, and responding to feedback. It can be a challenge for both the remote participants and host to gain feedback on the level of engagement in a meeting. The hosts are presented with a unique challenge in digital collaborative environments as there is a lack of visual and physical cues in these environments, particularly since it is an acceptable practice for attendees to turn off the camera and microphone functions. Since hosts do not receive continuous feedback, it can be very frustrating and stressful to present to a group. At best, the host may deliver a boring presentation and at worst the host and attendees may feel the presentation is a waste of time and money.

For participants, an in-person event would provide the space to raise hands, ask questions, maintain eye contact, and provide other indications of interest in the topic. In digital collaborative environments, there may be a perception of disconnect to the host and the people around them. Users in these environments tune out of the presentation and multitask. This disconnect has led to an increasing sense of resentment, frustration, lack of motivation, and lack of engagement with digital collaboration, again resulting in a waste of time and money for companies that invest in digital collaboration environments for meetings. Since the digital collaboration space will only continue to grow, with the worldwide collaboration applications market expected to be around $71.6 billion by the year 2027, companies will emphasize digital collaboration environments that engage their workforce. See Wayne Kurtzman, *Worldwide Collaborative Applications Forecast, 2023-2027: The AI-Enhanced Multiplayer Workplace*, IDC (July 2023), https://www.idc.com/getdoc.jsp?containerId=U.S. Pat. No. 51,040, 423.

Some approaches to the problem use features that mimic real-world events, such as a raised hand tool, to attempt to increase engagement. Others use surveys and tools during and after events to connect to the audience. Further, others use facial or voice recognition, which has been shown to be inaccessible, highly invasive, and biased.

For the reasons stated above, and for other reasons which will become apparent to those skilled in the art upon reading and understanding the specification, there is a need in the art for systems and methods for calculating, quantifying, and visualizing engagement in collaborative software applications. Thus, it is a primary object of the disclosure to provide systems and methods for providing quantitative data on the engagement of users of collaborative software applications.

These and other objects, features, or advantages of the present disclosure will become apparent from the specification and claims.

BRIEF SUMMARY OF THE DISCLOSURE

The disclosure relates to systems and methods that reshape the engagement mechanism in collaborative software applications, incentivizing participation through gamification and providing an instant feedback loop. This is achieved through the calculation of an engagement score resulting from user interactions with software. This results in actionable analytics that allows the host to accurately measure team engagement and ultimately improve performance and results. By integrating gamification into collaborative software applications, employees can connect with each other, watch the progress of teammates, be instantly rewarded for their work, and level up over time. When audience members or viewers engage with the collaborative software, whether on synchronous environments like video conferencing, Augmented Reality ("AR"), or Virtual Reality ("VR"), or asynchronous environments, or hybrid environments, they earn points and coins. These game mechanics (as well as others) provide a feedback loop to the participant to reinforce the dynamic that higher engagement results in the participant earning more points, coins, and a higher score. Each participant also earns an engagement score that is based on a proprietary algorithm factoring in the various engagement activities. These game mechanics (e.g., points, coins, boosts, badges, leaderboards, etc.) provide a unique ability to accurately quantify and measure engagement for each individual participant. The host receives an aggregated roll up of the audience engagement in the form of a data visualization. A suite of activities (e.g. polls, quizzes, etc.) allow the host to further boost engagement.

BRIEF DESCRIPTION OF THE DRAWINGS

FIG. 4 depicts a method for calculating an engagement score according to one embodiment.

DETAILED DESCRIPTION

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

System 100

A system for determining engagement in collaborative software applications 100 is disclosed. Collaborative software applications 100 are software applications used for conducting and participating in virtual collaborative events. A virtual collaborative event may be a training session, an educational class, a conference event, a virtual work meeting, a video chat, a virtually attended arts performance, or any other event attended by remote participants. A virtual collaborative event may be conducted through a video conferencing software application, augmented reality or AR software, virtual reality or VR software using a laptop, desktop, tablet, smart phone, wearables such as the Apple Watch, or any other platform configured to allow communication between remote participants. The system for determining engagement in collaborative software applications 100 may be referred to as system 100 without departing from the scope of the disclosure.

Figure 1:
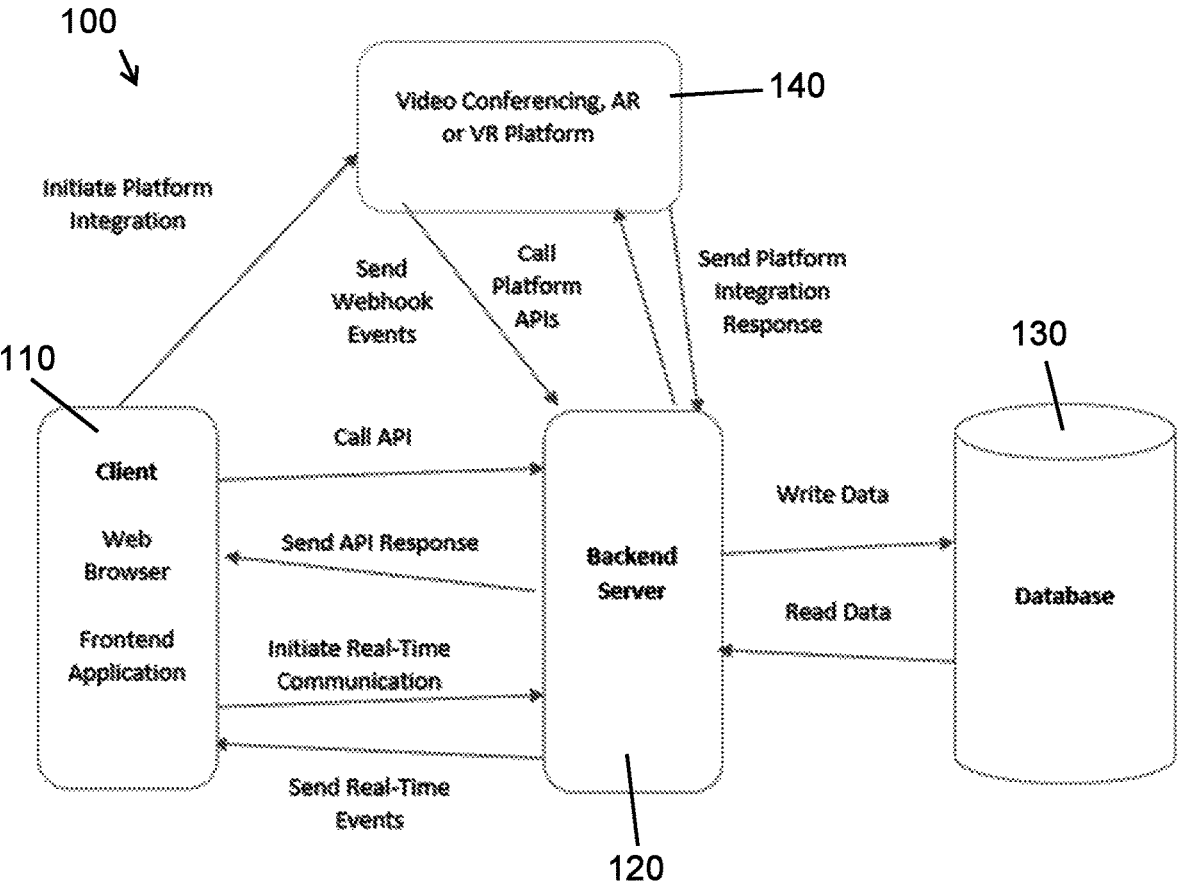
FIG. 1 depicts a system for determining engagement in collaborative software applications according to one embodiment.

As shown in FIG. 1, in one arrangement, system 100 comprises a client 110, a backend server 120, a database 130, and a video conferencing, augmented reality ("AR"), or virtual reality ("VR") platform 140. The video conferencing, AR, or VR platform 140 may be referred to simply as platform 140 without departing from the scope of the disclosure.

Client 110 comprises a device configured to run a front end application or web browser. Client 110 may comprise a desktop computer, laptop computer, smartphone, tablet, or other device configured to run the front end application or web browser.

Backend server 120 comprises a server or similar device configured to run software and communicate with other components of system 100.

Database 130 comprises a server or similar device configured to store data associated with system 100 while implementing method 200. Database 130 is configured to write data received from other components of system 100, and other components of system 100 may read data from database 130.

Platform 140 comprises a server or similar hardware configured to facilitate use of collaborative software applications. Platform 140 may run a video conferencing software application, augmented reality or AR software, and/or virtual reality or VR software.

Software applications are utilized to retrieve and send real time data between each of client 110, backend server 120, database 130, and platform 140. This software is built independently through client 110, backend server 120, and database 130. It is then integrated into platform 140 and must be slightly customized to meet requirements for each individual platform or application.

During a meeting, a number of client 110 devices may participate with each client 110 device corresponding to a unique user. At least one client 110 device is associated with the host of the meeting and one or more other client 110 devices are associated with other participants in the meeting.

Method 200

Figure 2:
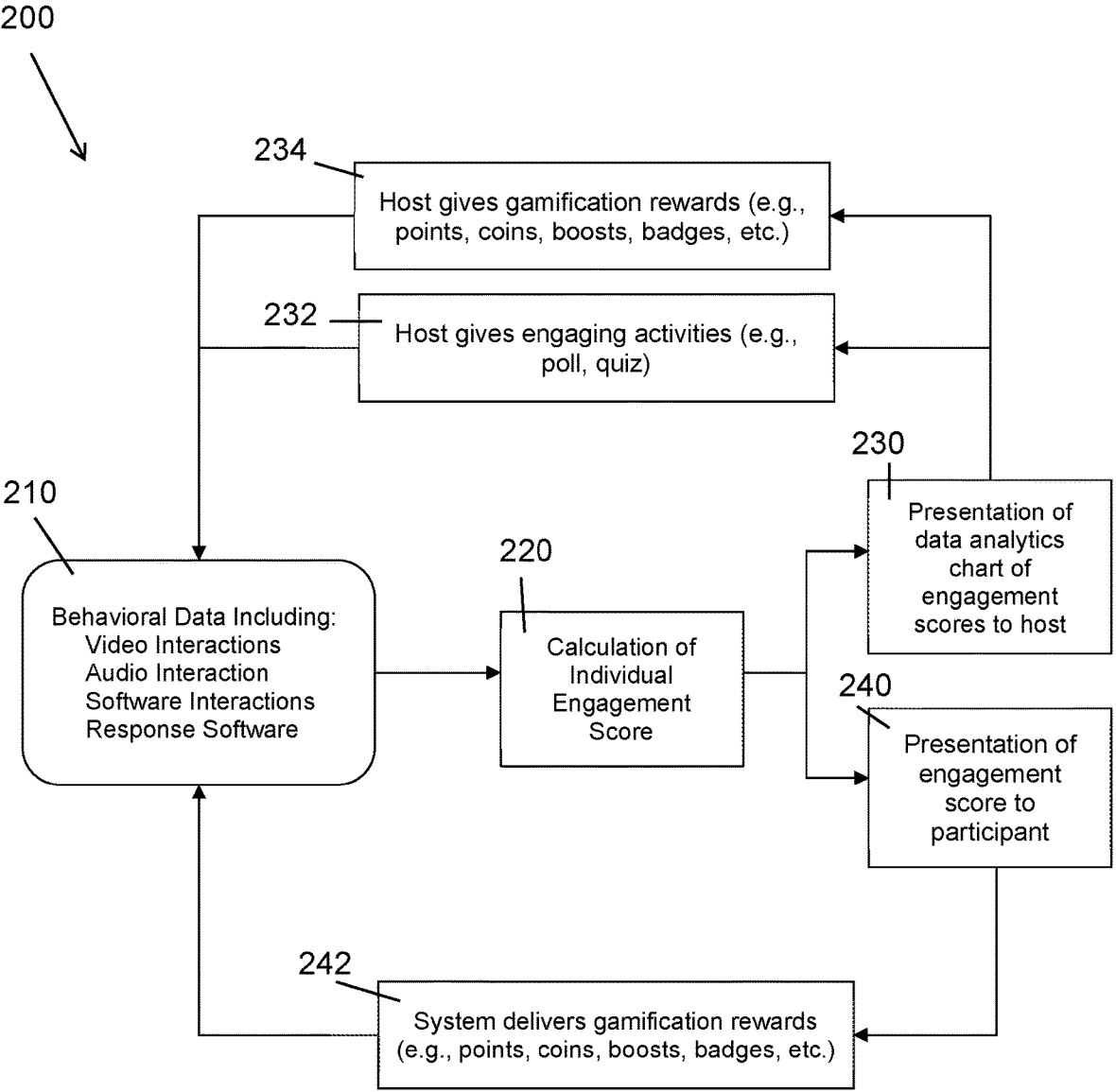
FIG. 2 depicts a method for determining engagement in collaborative software applications according to one embodiment.

As shown in FIG. 2, a method 200 for determining engagement in collaborative software applications begins at step 210 in which behavioral data of participants is collected by software running on backend server 120 as a virtual collaborative experience progresses and participants in the virtual collaborative experience interact with the software (e.g., Zoom) and the system 100. Behavioral data may include video interactions, audio interactions, and response software. Participant interaction with the software may include posting icons and engaging with the software in order to earn points, unlock achievements, and level up.

At step 220, behavioral data of participants collected at step 210 is used to calculate an individual engagement score for each participant. The engagement score calculation at step 220 is performed on software running on backend server 120. As shown in FIG. 4, in one embodiment, the engagement score is calculated using the following formula:

$$\begin{aligned}
\text{Engagement score} = &(V1*W1)+(V2*W2)+(V3*W3)+\\
&(V4*W4)+(V5*W5)+(V6*W6)+(V7*W7)+\\
&(V8*W8)+(V9*W9)+(V10*W10)+(V11*W11)+\\
&(V12*W12)+(V13*W13)+(V14*W14)+\\
&(V15*W15)+(V16*W16)+(V17*W17)+\\
&(V18*W18)+(V19*W19)+(V20*W20)+\\
&(V21*W21)+(V22*W22)+(V23*W23)+\\
&(V24*W24)+(V25*W25)
\end{aligned}$$

where V1=camera on and W1=6.00%
V2=camera off and W2=2.00%
V3=microphone on and W3=6.00%
V4=microphone off and W4=2.00%
V5=join meeting and W5=6.00%
V6=leave meeting and W6=2.00%
V7=first post to chat and W7=4.00%
V8=second post to chat and W8=4.00%
V9=third post to chat and W9=4.00%
V10=fourth post to chat and W10=4.00%
V11=fifth post to chat and W11=4.00%
V12=first share screen and W12=4.00%
V13=second share screen and W13=4.00%
V14=third share screen and W14=4.00%
V15=fourth share screen and W15=4.00%
V16=first emoji post and W16=4.00%
V17=second emoji post and W17=4.00%
V18=third emoji post and W18=4.00%
V19=fourth emoji post and W19=4.00%
V20=fifth emoji post and W20=4.00%
V21=first post to reaction and W21=4.00%
V22=second post to reaction and W22=4.00%
V23=third post to reaction and W23=4.00%
V24=fourth post to reaction and W24=4.00%
V25=fifth post to reaction and W25=4.00%

Accordingly, participants in the virtual collaborative experience are awarded points for each variable V1-V25, and the variables V1-V25 are weighted by weights W1-W25 to arrive at an engagement score. Other variables, weights, or formulas for calculating the engagement score may be used without departing from the scope of the disclosure.

Figure 3:
FIG. 3 depicts an exemplary user interface for the presentation of engagement score data analytics to event hosts according to one embodiment.
Figure 3:
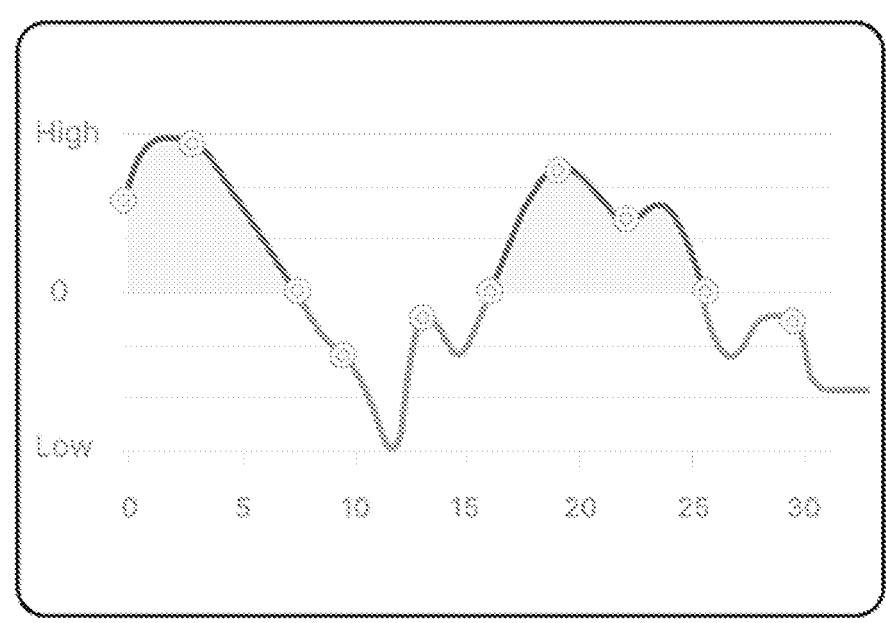

At step 230, the engagement scores calculated at step 220 are presented to the host of the virtual collaborative experience. The engagement scores may be aggregated and presented as a data analytics chart 300, making it easy for the host to evaluate the engagement level of participants at a glance. In response to the engagement chart 300 presented to the host at step 230, the host may add engaging activities at step 232 such as sending a poll or quiz to participants, starting a question-and-answer session, or engaging in another activity to increase engagement of participants. The host may also give gamification rewards such as points, coins, boosts, badges, etc. to participants to reward favorable engagement during the virtual collaborative event. The data analytics chart 300 presented to the host at step 230 may take the form of the exemplary chart 300 shown in FIG. 3.

At step 240, an individual participant's engagement score calculated at step 220 is presented to that participant. Along with the participant's score, gamification rewards (e.g., points, coins, boosts, badges, etc.) may be rewarded to the participant by the system 100 at step 242. This interaction with the system 100 produces a more engaging experience, therefore influencing behavioral data.

As engaging activities are provided at step 232 and gamification rewards are provided to participants at steps 234 and 242, participants' behavioral data is affected. The steps of method 200 are repeated throughout the duration of the virtual collaborative event creating a feedback loop intended to increase the overall engagement of participants in the event.

The system 100 and method 200 have many benefits and advantages including, but not limited to increasing engagement among users of collaborative software applications. These and other benefits and advantages are apparent from the specification and claims.

REFERENCE NUMERALS

100—system for determining engagement in collaborative software applications
110—client
120—backend server
130—database
140—video conferencing, AR, and/or VR platform, also referred to as "platform"
200—method for determining engagement in collaborative software applications
210—collecting behavior data
220—calculating individual engagement score for each participant
230—presenting data analytics chart of participant engagement to host
232—host gives engaging activities to increase engagement
234—host gives gamification rewards to participants
240—presenting individual engagement score and rewards to participant
242—system delivers gamification rewards to participants
300—data analytics chart, also referred to as engagement chart

What is claimed:

1. A computer-implemented method for determining and improving engagement in a virtual collaborative event, comprising:
   (a) conducting the virtual collaborative event by a video conferencing software application running on a conferencing server;
   (b) collecting by a software application running on a backend server from participant client devices, non-visual interaction data generated during the virtual collaborative event, wherein the non-visual behavioral data includes at least one of: chat interactions, emoji selections, user-interface clicks, screen-sharing interactions, and motion data from augmented reality (AR) or virtual reality (VR) sensors;
   (c) calculating, by the software application running on the backend server, a real-time engagement score for each participant using, an engagement-detection algorithm that converts the non-visual interaction data into quantitative engagement metrics using weighted coefficients corresponding to interaction type;
   (d) transmitting, by the backend server, the real-time engagement scores to a host interface having an interactive dashboard that displays a dynamic visualization of overall and individual participation levels; and
   (e) rewarding one or more gamification-based engagement incentives based on the individual engagement scores by the host, wherein the engagement incentives comprise at least one of: progressive levels, leaderboard rankings, points, coins, boosts, achievement badges, or unlockable digital rewards.

2. The method of claim 1 wherein collecting non-visual interaction data further comprises capturing participant chat interactions, emoji reactions, mouse clicks, screen-share activity, and AR/VR motion events generated through local client software.

3. The method of claim 1 wherein the engagement-detection algorithm applies weighted coefficients to different non-visual engagement activities based on predefined participation impact factors to generate the engagement data or metrics.

* * * * *